United States Patent Office 3,510,537
Patented May 5, 1970

3,510,537
FORMATION OF DIOLEFINS FROM INTERNAL OLEFINS
Ming Nan Sheng, Cherry Hill, N.J., and John G. Zajacek, Strafford, Pa., assignors to Atlantic Richfield Company, New York, N.Y., a corporation of Pennsylvania
No Drawing. Filed Oct. 16, 1967, Ser. No. 675,361
Int. Cl. B01j 1/10; C07c 73/00, 11/18
U.S. Cl. 260—681
10 Claims

ABSTRACT OF THE DISCLOSURE

Method for the catalytic oxidation of internal olefins to produce a mixture of unsaturated alcohols and the epoxide, and specifically oxidation of 2-methylbutene-2, isomerization of the oxidation product followed by dehydration of the isomerized product to produce isoprene.

BACKGROUND OF THE INVENTION

Field of the invention

This invention relates to a method for the catalytic oxidation of internal olefins to produce a mixture of the isomeric unsaturated alcohols and the epoxide. In one embodiment, the invention relates to the catalytic oxidation of 2-methylbutene-2 to produce a mixture of 2-methyl-3-hydroxy-1-butene; 3 - methyl - 3 - hydroxy-1-butene and 2 - methyl - 2,3 - epoxybutane, isomerization of the 2 - methyl - 2,3 - epoxybutane in the oxidation product mixture to the 2 - methyl - 3 - hydroxy-1-butene and dehydration of the combined alcohols to produce isoprene.

PRIOR ART

It is known that olefins including internal olefins can be epoxidized utilizing molecular oxygen and a heavy metal catalyst such as the compounds of molybdenum, vanadium and tungsten. The epoxide yield is poor, however, and there is also produced a variety of other oxidation products such as the epoxy alcohols, carbonyl compounds, heavy high molecular weight dark-colored materials and the like. Such a mixture is of little use as an intermediate in the production of desirable chemical compounds.

It has also been shown in U.S. Pat. No. 2,950,237 that 2-methylbutene-2 may be photooxidized to a mixture of two isomeric unsaturated hydroperoxides by irradiating with light in the visible range utilizing a photosensitizer and air or pure molecular oxygen.

The present invention differs from this known prior art since it provides a method for oxidizing internal olefins to a good yield comprising a mixture of the isomeric unsaturated alcohol or alcohols and the epoxide. This latter compound can be isomerized to the corresponding unsaturated alcohol thus providing an unsaturated alcohol or a mixture of the unsaturated alcohols having utility as intermediates in the preparation of other useful compounds. For example, as in a specific embodiment of this invention the oxidation of 2-methylbutene-2 and subsequent isomerization of the oxidation product mixture gives 2-methyl-3-hydroxy-1-butene and 3-methyl-3-hydroxy-1-butene which when dehydrated give isoprene.

Isoprene can be polymerized to cis-polyisoprene which is sufficiently similar to natural rubber to be a highly useful polymer. Two problems have prevented the full commercialization of this polymer. The first problem has been finding a method for producing isoprene at a cost which would render the polymer competitive in price with natural rubber, and the second is providing a method for producing isoprene of sufficiently high purity which will give a polymer having physical properties competitive with natural rubber. If isoprene has a little as 0.1 percent of other polymerizable materials, the physical properties of the cis-polyisoprene produced therefrom will be sufficiently deleteriously affected to render the polymer completely inferior to natural rubber.

Methods have been developed which potentially could produce isoprene at a competitive cost, for example, by catalytically dehydrogenating 2-methylbutene-2. The 2-methylbutene-2, however, when produced commercially is admixed with other $C_5$ olefins which cannot be separated by conventional commercial methods with the result, upon dehydrogenation, other compounds are produced along with the isoprene which are also not separable by conventional commercial methods and which render the isoprene unsuitable for polymerization to a polymer competitive with natural rubber.

This invention provides a method for the production of isoprene which is potentially capable of producing the compound at a cost and purity not obtainable with prior art methods.

SUMMARY OF THE INVENTION

In its broadest aspect the present invention resides in a process for the oxidation of compounds having a nonterminal olefinic double bond, i.e., internal olefins, represented by the formula

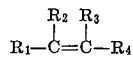

wherein $R_1$, $R_2$, $R_3$ and $R_4$ may be like or different straight or branched chain alkyl radicals, aryl radicals, alkaryl radicals or aralkyl radicals and either $R_2$ or $R_3$ or both may be hydrogen with the molecule having from 4 to 30 carbon atoms. The oxidation is carried out with a free oxygen containing gas such as air or oxygen by irradiating with visible light utilizing a photosensitizer and a soluble molybdenum-containing catalyst. There is produced the isomeric unsaturated alcohols and the epoxide.

In another aspect of the invention 2-methylbutene-2 is oxidized utilizing oxygen, visible light irradiation, a photosensitizer and a molybdenum-containing catalyst to produce a mixture of 2-methyl-3-hydroxy-1-butene and 3-methyl-3-hydroxy-1-butene together with 2 - methyl - 2,3-epoxybutane. The combined amounts of the alcohols is approximately equal to the amount of the epoxide. The oxidation product mixture is isomerized in the presence of a lithium phosphate catalyst, thereby isomerizing the epoxide to the corresponding alcohol, i.e., 2-methyl-3-hydroxy-1-butene. The two alcohols in the total mixture are thereafter dehydrated over magnesium sulfate to produce isoprene.

It is an object of this invention therefore to provide a process for the oxidation of internal olefins to produce a mixture of unsaturated alcohols and the epoxide.

It is another object of this invention to provide a method for the oxidation of 2-methylbutene-2 to produce a mixture of 2-methyl-3-hydroxy-1-butene; 3-methyl-3-hydroxy-1-butene and 2-methyl-2,3-epoxybutane.

It is another object of this invention to provide a method for the production of isoprene by the oxidation of 2 - methylbutene - 2, isomerization of the oxidation product and dehydration of the combined isomerized product and oxidation products.

Other objects and advantages of this invention will be apparent to those skilled in the art from the accompanying disclosure.

DESCRIPTION OF PREFERRED EMBODIMENTS

As stated, the present invention is directed to the oxidation of internal mono-olefins having from 4 to 30 carbon atoms in the molecule. Of this group the normally liquid compounds are preferred, with those having a tertiary carbon atom attached to the double bond being particularly preferred. Di- and poly-olefins are not preferred since they give complex mixtures of compounds which cannot be separated and are not useful. Examples of the preferred compounds include: pentene-2; 2-methylpentene-2; 3-methylpentene-2; hexene-2; 2-methylhexene-2; 3-methylhexene - 2; 2,3-dimethyl-pentene-2; 2,3-dimethylhexene-2; dodecene-2; 2-methyl dodecene-2; hexadecene-2; 2-methyl hexadecene-2; eicosene-2; triacontene-2; 4-propyl-5-n-butyl-undecene-4; and the like. Higher internal olefins may be obtained, for example, by the dehydrohalogenation of monochlorinated paraffins. The most prefered olefin is the 2-methylbutene-2.

The oxidation products comprise the isomeric alcohol or alcohols and the epoxide corresponding to the olefin starting material. As is known in epoxidation reactions, the two carbons of the double bond become those of the oxirane ring. The alcohols have the allylic structure, i.e., the nucleus

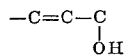

In instances where cycloolefins are oxidized, only one alcohol and one epoxide will be produced. For example, with cyclohexene there is produced 2-cyclohexene-1-ol, and 1,2-epoxycyclohexane. If 2-methylpentene-2 is oxidized in accordance with the method of this invention there are produced 2-methyl-3-hydroxy-1-pentene; 3-methyl-3-hydroxy-2-pentene and 2-methyl-2,3-epoxypentane. If the olefin is 2,3-dimethylbutene-2 there are produced 2,3-dimethyl-3-hydroxy-1-butene; and 2,3-dimethyl-2,3-epoxybutane. When 3-methylpentene-2-is oxidized by the method of this invention three isomeric alcohols are produced, i.e., 3-methyl-4-hydroxy-2-pentene; 2-ethyl-3-hydroxy-1-butene and 3-methyl-3-hydroxy-1-pentene. The epoxide produced is, of course, the 3-methyl-2,3-epoxypentane.

The oxidation is carried out preferably in glass apparatus transparent to visible light. Light in the range of 3600 to 8000 angstroms in wave length is very suitable. Light in the ultraviolet region is not preferred since it tends to catalyze undesirable side reactions. The speed of the oxidation reaction is proportioned to the intensity of the irradiation. The light may be furnished by any convenient means. For example, three 150-watt spotlights have been employed with a glass reaction vessel equipped with a mechanical stirrer, means for introducing oxygen or air into the reaction mixture and a reflux condenser. It also has been found the circular fluorescent light sources around the reaction vessel are suitable or in one design the reaction mixture filled the annular space between two concentric tubes with the light source consisting of a straight fluorescent tube positioned inside the inner tube of the reactor. This design permits exceedingly efficient use of the light source.

In general, the light source furnishes the necessary heat for the reaction, however, the heat may be furnished by any conventional method. The reaction may be carried out at temperatures only slightly above room temperature, for example, 30° C. Since the reaction is rather slow at the lower temperatures it is preferred to use reflux temperatures. When 2-methylbutene-2 is the olefin being oxidized the reflux temperature of the reaction mixture is in the range of from 40° C. to 50° C. With higher boiling olefins, higher reflux temperatures, of course, result.

The amount of oxygen or air introduced into the reaction is not extremely critical, however, it is preferred that it be sufficient to keep the reaction mixture saturated.

The molybdenum-containing catalyst is, preferably, a compound of molybdenum which is soluble in the reaction medium, i.e., an organic soluble molybdenum-containing catalyst. Suitable compounds for use in this invention are those molybdenum-containing catalysts shown in Belgian Pat. No. 674,076, dated June 20, 1966 which patent relates to epoxidation of olefins using such molybdenum catalysts. Molybdenum oxyacetylacetonate is a particularly preferred catalyst. The amount of catalyst, i.e., the molybdenum, is in the catalytic range, preferably from 0.001 weight percent to 1.0 weight percent of the olefin reaction mixture. Higher or lower amounts may be used, with amounts in the range of about 0.01 to 0.1 weight percent, however, being particularly suitable.

The photosensitizer or photoxidation catalyst is a porphin having aromatic meso-substitution. Particularly preferred are the meso-tetraarylporphins catalysts set forth in U.S. Pat. 2,950,237 (1960) including the meso-tetraphenylporphin. Various methods of preparing these catalysts are set forth in the above-mentioned patent and in U.S. Pat. No. 3,076,813. In addition a particularly convenient method for preparing the meso-tetraphenylporphin is shown in the article by Adler et al., Journal of Organic Chemistry, vol. 32, p. 476 (1967). No difference has been found for meso-tetraphenylporphin prepared by the method of the patent as compared with the compound prepared by the method of Adler et al. The amount of photosensitizer is not extremely critical, however, enough of the compound should be employed to absorb the light completely. In general, from about 0.01 to 1.0 weight percent of the substituted porphin of the olefin reaction mixture is sufficient.

The examples which follow are provided for the purpose of illustration and should not be considered unduly limiting.

EXAMPLE I

A 750 ml. sample of 2-methylbutene-2 (approximately 496 grams, 7 moles) were placed in a glass reaction vessel together with 50 ml. of benzene and 0.01 gram of alpha-beta - gamma-delta-tetraphenylporphin (meso-tetraphenylporphin) and 0.01 gram of molybdenum oxyacetylacetonate. The vessel was provided with a stirrer, reflux condenser and inlet for oxygen. The heat for the reaction was supplied from the light sources which were three 150-watt spotlights. Oxygen was bubbled through the reaction mixture at a rate sufficient to keep the mixture saturated and the reaction temperature was maintained at reflux temperature. The formation of the unsaturated alcohols and the epoxide was followed by gas chromatography and the hydroperoxide was determined by the sodium thiosulfate iodine titration by the method of D. H. Wheeler, "Oil and Soap" 9, 89 (1932). The results which were obtained are shown in Table I.

TABLE I

| Time (hr.) | Allyl alcohols [1] (g). | Epoxide [2] (g.) | Hydroperoxide (g.) |
|---|---|---|---|
| 4 | 9 | 10 | 11 |
| 6 | 20 | 20 | 11 |
| 12 | 38 | 41 | 11 |
| 16 | 60 | 56 | 11 |
| 28 | 89 | 89 | 11 |
| 30 | 109 | 105 | 11 |

[1] 2-methyl-3-hydroxy-1-butene and 3-methyl-3-hydroxy-1-butene.
[2] 2-methyl-2,3-epoxybutane.

It will be seen from the table that approximately equal amounts of the unsaturated alcohols, i.e., 2-methyl-3-hydroxy-1-butene and 3-methyl-3-hydroxyl-1-butene, and the 2-methyl-2,3-epoxybutane were formed which indicated that there was no epoxidation of the unsaturated alcohols occurring. A small amount of hydroperoxides was formed amounting to between 10 and 15 grams but this amount remained approximately constant during the reaction indicating that the catalyst mixture was not being deactivated.

EXAMPLE II

In another oxidation run using 2-methylbutene-2 as the olefin and carried out in the same manner as in Example I after 16 hours 56 grams of the alcohols were produced and 51 grams of the epoxide was produced. After 30 hours 111 grams of the alcohols and 95 grams of the epoxide had been produced. These results and the results of a number of other runs demonstrated that the same yields of the allylic alcohols and the epoxide could be obtained from run to run.

In another preferred embodiment of the invention, 2-methylbutene-2 is oxidized in the same manner as in Example I and thereafter the mixed alcohols and epoxide product (after separation of unreacted olefin and hydroperoxides) is passed over a lithium phosphate catalyst. Suitable lithium phosphate catalysts and isomerization methods are disclosed in U.S. Pat. Nos. 2,986,585 (1961) to Denton and 3,255,258 (1961) to Charles et al. and in British Pat. No. 1,057,137 (1967).

The Denton patent discloses leached basic lithium phosphate having residual alkali metal hydroxide equivalent to 0.05 to 1 weight percent. The Denton catalyst is prepared by reacting lithium hydroxide dissolved in water with an aqueous solution of sodium orthophosphate heated to 30° C. to 60° C. and preferably to about 40° C. The sodium phosphate solution was added to the lithium hydroxide solution with agitation to produce a precipitate. The precipitate is leached a number of times with excess hot distillate water followed by filtration each time to produce a final leaching solution having a pH from about 10 to 11.

The catalyst of the British Patent is produced by rapidly mixing aqueous solutions of a lithium salt and an orthophosphate salt under conditions such that the resulting mixture has a pH between 7 and 14. The lithium is utilized in a small excess such that the ratio of the number of atoms of lithium to the number of atoms of phosphorous is in the range of from 3.06 to 3.7. Following precipitation the catalyst is separated from the liquid and washed with water to remove water soluble material other than the lithium and trilithium phosphate.

The Charles et al. patent discloses an isomerization process wherein the epoxide is passed through a suspension of fine particles of trilithium phosphate in an auxiliary liquid maintained at 180° C. to 400° C. The auxiliary liquid used for the suspension may be diphenyl oxide or other aryl substituted benzenes for example diphenyl, ortho-meta- and para-diphenylbenzene (terphenyls), isomers of triphenylbenzene, in particular, 1,3,5-triphenyl benzene and other polyphenyls.

The isomerization reaction can be carried out by contacting the epoxide-containing oxidation product mixture with the lithium phosphate catalyst in a fixed bed by passing the charge mixture through the bed at a sufficient rate to obtain acceptable conversion. The conversion initially obtained will decrease with time at a fairly rapid rate probably because of the deposition of resinous material upon the catalyst. The use of the auxiliary liquid of Charles et al. prevents such decrease in conversion. The impurities which are formed remain in the solution in the auxiliary liquid and from time to time if necessary this liquid can be subjected to regeneration (after separation of the solid catalyst therefrom) by distillation to remove the heavy impurities.

A suitable system for carrying out the reaction consists of a vessel equipped with agitation means with the reactants preferably supplied to the lower end thereof as a vapor and the products being removed from above the catalyst suspension, a vacuum being applied, if necessary. With short time batch type runs a somewhat simpler apparatus can be employed consisting of a column in which the epoxide-containing charge is allowed to pass downwardly over lumps of the lithium phosphate catalyst and into a receiver at the bottom of the column. The fixed bed of catalyst can be heated by any convenient means, for example, by an electric heating coil.

While the isomerization can be carried out with the epoxide in liquid phase it is preferable to use vapor phase operation and although batch or continuous operation can be used, in view of the ease of handling the materials, continuous operation is preferred. The temperatures for the isomerization reaction is generally in the range of 80° C. to 250° C. although the reaction can be carried out at temperatures outside these ranges with lower yields. When operating with a packed column of the catalyst it is preferable to operate at temperatures of 130° C. to 200° C. with slightly higher temperatures, preferably 150° C. to 225° C. when the suspended catalyst isomerization system is used. The amount of catalyst either in the fixed bed or in the suspension is not critical as long as there is an appreciable amount present compared with the quantity of epoxide to the isomerized and the upper limit in the case of the suspension system is that which provides good distribution and good isomerization and which can be properly agitated in the auxiliary liquid. For optimum results some experimentation may be necessary to find the proper reaction temperature in the suspension system. The variables include viscosity of the auxiliary liquid, particle size of the catalyst, the amount of catalyst employed and the type of agitation used.

Examples III, IV and V which follow are provided to illustrate the isomerization step.

EXAMPLE III

Catalyst preparation

A solution of lithium hydroxide was prepared by dissolving 126 grams (3 moles) of the monohydrate in 500 cc. of distilled water. A solution of sodium orthophosphate was prepared by dissolving 570 grams (1.5 moles) of the dodecahydrate in 750 cc. of distilled water and the solution was warmed to about 40° C. The latter solution was added in one or two minutes to the first, during agitation, and resulted in the formation of a precipitate at a pH of 12 to 14. The precipitate was filtered and washed and was then dispersed in about 1.5 to 2 liters of distilled water at a temperature about 95° C. After thorough agitation of the suspension for ten to thirty minutes, the precipitate was again filtered and washed. The leaching with excess hot distilled water and filtration was repeated four more times, the final leaching solution having a pH of 10 to 11. The filter cake was dried for 16 hours in an oven at 2000° C. and the catalyst was prepared for use by subdividing into pieces of about 4 to 12 mesh.

Isomerization—Fixed bed

The catalyst prepared as described in the first part of this example was used to fill a ½" diameter glass tube having a length of 3". This was surrounded by a heating coil to maintain the desired isomerization temperature. A portion of 2-methyl-2,3-epoxybutane produced as described in Example I, separated from unreacted olefin and alcohol products for ease in determining yields, was isomerized by passing vapors of the epoxide downwardly through the catalyst chamber, nitrogen being used to push the epoxide vapor through the catalyst chamber. It was found that the epoxide was isomerized to 2-methyl-3-hydroxy-1-butene selectively. The unsaturated alcohol was identified by gas chromatography, infra-red and nuclear magnetic resonance spectroscopy. A small amount of by-product was produced which was identified as a carbonyl compound. This compound, however, did not interfere with the isolation of the main product, i.e., the alcohol, by distillation. The experimental data and results are shown in Table II.

TABLE II

| Run | Temp., °C. | Flow rate, ml./min. | Products, weight percent | | |
|---|---|---|---|---|---|
| | | | Unreacted epoxide | 2-methyl-3-hydroxy-1-butene | By-product (c=o) |
| 1[1] | 122±1 | 3.5/36 | 11.6 | 82.0 | 6.4 |
| 2[1] | 140±.5 | 3.5/29 | 3.4 | 89.9 | 6.7 |

[1] Fresh catalyst was used in each run.

EXAMPLE IV

A sample of the catalyst prepared in Example III was ground to a particle size of a few microns. This catalyst was suspended in ortho-terphenyl. In the runs which follow, for runs 1 to 8 inclusive, 12.75 grams of the lithium phosphate was suspended in 72.25 grams of the ortho-terphenyl to give a suspension of 15 percent catalyst. In runs 9 to 11 inclusive, 17.6 grams of lithium phosphate was suspended in 70 grams of ortho-terphenyl to give a 20 percent catalyst suspension. In each run the suspension was used in a column approximately 1" in diameter and 12" high equipped with an agitator. The epoxide was vaporized and passed into the bottom of the column through a sintered glass filter and the effluent was removed by applying a vacuum to the column and condensing the vapors removed. All of the runs were carried out at a pressure of 200 mm. of mercury above the reaction mixture. The reaction conditions and results are set forth in Table III.

TABLE III

| Run | Temp., °C. | Flow rate, g./min. | Products, weight percent | | |
|---|---|---|---|---|---|
| | | | Unreacted epoxide | 2-methyl-3-hydroxy-1-butene | By-product (c=o) |
| 1 | 170 | 11/15 | 34.7 | 60.5 | 4.9 |
| 2 | 170 | 9.9/15 | 26.0 | 69.0 | 5.0 |
| 3 | 170 | 10.3/20 | 27.0 | 68.7 | 4.3 |
| 4 | 170 | 8.8/12 | 29.6 | 67.4 | 3.0 |
| 5 | 170 | 8.7/20 | 12.2 | 85.0 | 2.7 |
| 6 | 190 | 8.4/20 | 24.4 | 70.9 | 4.7 |
| 7 | 190 | 10.1/25 | 25.0 | 70.0 | 5.0 |
| 8 | 210 | 8.7/20 | 12.1 | 82.0 | 5.9 |
| 9 | 170 | 10.2/20 | 34.0 | 59.0 | 7.0 |
| 10 | 170 | 4.7/10 | 20.3 | 75.2 | 4.3 |
| 11 | 210 | 4.3/15 | 12.0 | 85.0 | 3.0 |

It was found that the efficiency of the catalyst did not drop over numerous runs and the selectivity of the 2-methyl 3-hydroxy-1-butene is over 90 percent. With the suspension of 15 percent catalyst there was obtained a 72.5 percent conversion and a 94 percent selectivity at 170° C. and an 88 percent conversion and a 93 percent selectivity at 210° C. With the 20 percent catalyst suspension there was obtained an 80 percent conversion and 95 percent selectivity at 170° C. and an 88 persent conversion and 96 percent selectivity at 210° C.

EXAMPLE V

In order to show that mixtures of the allyl alcohols and the epoxide from 2-methylbutene-2 oxidation can be isomerized a mixture consisting of 46 weight percent 2-methyl-2,3-epoxybutane 27 weight percent 2-methyl-3-hydroxy-1-butene and 27 weight percent 3-methyl-3-hydroxy-1-butene was passed over pieces of lithium phosphate catalyst in the manner described in Example III. A temperature of 140° C. was employed with a charge rate of 7 grams/hour. The product analyzed 1 weight percent unreacted epoxide, 27 weight percent 3-methyl-3-hydroxy-1-butene, 69 weight percent 2-methyl-3-hydroxy-1-butene and 3 weight percent carbonyl by product. This run demonstrated that the oxidation product from 2-methylbutene-2 can be isomerized to convert the 2-methyl-2,3-epoxybutane to the corresponding alkyl alcohol, i.e., 2-methyl-3-hydroxy-1-butene at high yields.

The allyl alcohols produced by the oxidation of the internal olefin and by isomerization of the epoxide as has been described can be dehydrated to the corresponding di-olefin. Thus, if 2-methylbutene-2 is oxidized and the oxidation mixture isomerized there will be obtained the two isomeric alcohols, 2-methyl-3-hydroxy-1-butene and 3-methyl-3-hydroxy-1-butene which when dehydrated produce isoprene.

Although Examples III, IV and V are concerned with the isomerization of 2-methyl-2,3-epoxybutane produced by the oxidation of 2-methylbutene-2 in accordance with this invention, if it is desired to produce other allyl alcohols corresponding to a particular mono-olefin of this invention, the olefin is oxidized with air or other free oxygen containing gas in the presence of a photosensitizer and a molybdenum catalyst with light irradiation. The oxidation mixture is thereafter isomerized as has been described in Examples III, IV and V to produce the desired allyl alcohol or mixture of allyl alcohols.

The allyl alcohols can be utilized as such or can be dehydrated to their corresponding di-olefins.

The dehydration is carried out over anhydrous magnesium sulfate. The catalyst was prepared by moistening anhydrous magnesium sulfate powder with water, pelleting the moistened powder (approximately 3/16" diameter by 1/8" thick) and drying the pellets at 1000° F. for 16 hours. The pellets were held at 150° C. for at least eight hours prior to use. Temperatures in the range of 240° C. to 260° C. are suitable with 245° C. to 255° C. being more preferred.

While magnesium sulfate is shown as a specific embodiment any dehydration catalyst known in the art can be used, for example, alumina, silica-alumina and the like.

EXAMPLE VI

A sample of 2-methyl-3-hydroxy-1-butene vapor was passed through a 3" x 5" column packed with anhydrous magnesium sulfate pellets produced as described. The pellets were held at a temperature of about 254° C. by means of a heating coil surrounding the column. The unsaturated alcohol was charged at the rate of about 9 ml./hour. The product recovery was 94 percent of the charge, the conversion was 86 percent and the yield of isoprene was 97 percent.

EXAMPLE VII

The isomerized product obtained by the process set forth in Example V was dehydrated as described in Example VI. A temperature of 245° C. to 247° C. was employed with a charge rate (liquid) of about 10 ml./hour. The product obtained analyzed 73.2 percent isoprene; 3-methyl-3-hydroxy-1-butene, 0.0 percent; 2-methyl-3-hydroxy-1-butene, 7.6 percent; carbonyl by-product 5.0 percent; and by-product not identified 14.2 percent. The total product recovered based on the charge was approximately 90 percent. All of the above are in weight percent.

This run demonstrated that isoprene can be produced by the three-step process of this invention utilizing 2-methylbutene-2 as the starting olefin.

In both Examples VI and VII the by-products were compounds easily separable by distillation from the isoprene thus demonstrating that one of the specific objects of this invention can be realized, i.e., the production of pure isoprene useful as a monomer in the manufacture of cis-polyisoprene.

We claim:

1. A method for the catalytic oxidation of internal olefins which comprises irradiating an internal olefin having from 4 to 30 carbon atoms in the molecule with light in the presence of a free oxygen containing gas, a photosensitizing catalyst and a molybdenum containing catalyst.

2. The method according to claim 1 wherein the light is in the visible range, the photosensitizing catalyst is a meso-tetraarylporphin and the molybdenum catalyst is a compound of molybdenum soluble in the reaction medium.

3. The method according to claim 1 wherein the light has a wave length in the range of from 3600 to 8000 angstroms, the photosensitizing catalyst is meso-tetraphenylporphin and the molybdenum containing catalyst is molybdenum oxyacetyl-acetonate.

4. The method according to claim 1 wherein the internal olefin is 2-methylbutene-2.

5. The method according to claim 1 wherein the oxidation product is subjected to isomerization over a lithium phosphate catalyst.

6. The method according to claim 1 wherein the internal olefin is 2-methylbutene-2 and the 2-methyl-2,3-epoxybutane produced in the oxidation reaction is isomerized over lithium phosphate to 2-methyl-3-hydroxy-1-butene.

7. The method according to claim 5 wherein the oxidized and isomerized product produced by the oxidation and isomerization steps are dehydrate over a dehydration catalyst at temperatures in the range of 240° C. to 260° C.

8. The method according to claim 1 wherein olefin is 2-methylbutene-2, the light has a wave length in the range of 3600 to 8000 angstroms, the photosensitizing catalyst is meso-tetraphenylporphin, the molybdenum containing catalyst is molybdenum oxyacetylacetonate and the 2-methylbutene-2 is oxidized to a mixture of 2-methyl-3-hydroxy-1-butene; 3-methyl-3-hydroxy-1-butene and 2-methyl-2,3-epoxybutane.

9. The method according to claim 8 wherein the mixture resulting from the oxidation is isomerized over a lithium phosphate catalyst at temperatures in the range of from 80° C. to 250° C. and the isomerized product is dehydrated over a magnesium sulfate catalyst to produce isoprene.

10. The method according to claim 7 wherein the internal olefin is 2-methylbutene-2, the light has a wave length in the range of from 3600 to 8000 angstroms, the photosensizing catalyst is meso-tetraphenylporphin, the amount of photosensitizing catalyst is in the range of 0.01 to 1.0 weight per cent of the 2-methylbutene-2 reaction mixture, the the molybdenum containing catalyst is molybdenum oxyacetylacetonate in an amount ranging between 0.001 and 1.0 weight percent of the 2-methylbutene-2 reaction mixture, the oxidation reaction product mixture comprises 2-methyl-3-hydroxy-1-butene,3-methyl-3-hydroxy-butene and 2-methyl-2,3-epoxybutane, the 2-methyl-2,3-epoxybutane in the oxidation reaction product mixture is isomerized over a lithium phosphate catalyst at a temperature of from 80° C. to 250° C. to produce 2-methyl-3-hydroxy-1-butene, and the resulting mixture of 2-methyl-3-hydroxy-1-butene and 3-methyl-3-hydroxy-1-butene is dehydrated over a magnesium sulfate catalyst at a temperature of from 240° C. to 260° C. to produce isoprene.

References Cited

UNITED STATES PATENTS

| | | | |
|---|---|---|---|
| 3,351,635 | 11/1967 | Kollar | 260—348.5 |
| 3,360,584 | 12/1967 | Kollar | 260—681 |
| 3,355,505 | 11/1967 | Tedeschi | 260—642 |
| 3,391,213 | 7/1968 | Fetterly | 260—681 |
| 3,391,214 | 7/1968 | Fetterly | 260—681 |
| 2,558,844 | 7/1951 | Gray et al. | 204—158 |
| 2,950,237 | 8/1960 | Sharp | 204—158 |
| 2,951,800 | 9/1960 | Sharp | 240—162 |
| 2,955,996 | 10/1960 | Mashio et al. | 204—158 |
| 2,951,800 | 9/1960 | Sharp | 204—162 |
| 2,986,585 | 5/1961 | Denton | 260—632 |
| 3,068,291 | 12/1962 | Amir | 260—593 |
| 3,109,800 | 11/1963 | Sharp | 204—162 |
| 3,255,258 | 6/1966 | Charles et al. | 260—632 |

DELBERT E. GANTZ, Primary Examiner

G. E. SCHMITKONS, Assistant Examiner

U.S. Cl. X.R.

204—158, 162, 632, 642; 260—348.5, 610